(12) United States Patent
Massey

(10) Patent No.: US 10,703,135 B2
(45) Date of Patent: Jul. 7, 2020

(54) INFLATION HUBCAP INSTALLATION SYSTEM

(71) Applicant: Stemco Products, Inc., Charlotte, NC (US)

(72) Inventor: Michael James Massey, Longview, TX (US)

(73) Assignee: Stemco Products, Inc., Charlotte, NC (US)

( * ) Notice: Subject to any disclaimer, the term of this patent is extended or adjusted under 35 U.S.C. 154(b) by 144 days.

(21) Appl. No.: 15/577,958

(22) PCT Filed: Jun. 13, 2016

(86) PCT No.: PCT/US2016/037257
§ 371 (c)(1),
(2) Date: Nov. 29, 2017

(87) PCT Pub. No.: WO2016/205135
PCT Pub. Date: Dec. 22, 2016

(65) Prior Publication Data
US 2018/0134073 A1 May 17, 2018

Related U.S. Application Data

(60) Provisional application No. 62/175,861, filed on Jun. 15, 2015.

(51) Int. Cl.
*B60B 29/00* (2006.01)
*B60B 31/06* (2006.01)
(Continued)

(52) U.S. Cl.
CPC ............ *B60B 29/003* (2013.01); *B60B 31/00* (2013.01); *B60B 31/06* (2013.01); *B60C 23/003* (2013.01)

(58) Field of Classification Search
CPC ..... B60B 29/003; B60B 31/06; B60C 23/003; B60C 31/00; B25B 23/0085
(Continued)

(56) References Cited

U.S. PATENT DOCUMENTS 1,641,252 A * 9/1927 Alexander .............. B25B 13/08
81/125
2,305,274 A * 12/1942 Power ..................... B25B 23/00
81/124.3
(Continued)

OTHER PUBLICATIONS

International Preliminary Report on Patentability for PCT/US2016/037257 dated Dec. 28, 2017.
(Continued)

*Primary Examiner* — Hadi Shakeri
(74) *Attorney, Agent, or Firm* — Perkins Coie LLP

(57) ABSTRACT

Technology is provided for an inflation hubcap installation system for connecting an air hose to an inflation hubcap air fitting. The inflation hubcap installation system includes a locking tool, a tool retainer, and a torque wrench adapter. The locking tool includes a hubcap interface portion and a wrench portion configured to engage the air fitting when the hubcap interface portion is connected to the inflation hubcap. The tool retainer connects to the locking tool and retains the locking tool on the inflation hubcap. The torque wrench adapter engages the air hose and connects to a suitable torque wrench.

7 Claims, 4 Drawing Sheets

(51) Int. Cl.
*B60B 31/00* (2006.01)
*B60B 23/00* (2006.01)
*B60C 23/00* (2006.01)

(58) Field of Classification Search
USPC ........................................................ 81/176.1
See application file for complete search history.

(56) References Cited

U.S. PATENT DOCUMENTS

| | | | | |
|---|---|---|---|---|
| 3,977,063 | A * | 8/1976 | Bruninga | ................ B25B 13/48 |
| | | | | 29/890.143 |
| 4,875,395 | A * | 10/1989 | Alvarez | ................ B60B 29/004 |
| | | | | 81/13 |
| 5,538,062 | A * | 7/1996 | Stech | .................... B60C 23/003 |
| | | | | 152/415 |
| 5,954,466 | A * | 9/1999 | Coffey | .................... B25B 27/16 |
| | | | | 411/119 |
| 6,425,427 | B1 | 7/2002 | Stech | |
| 6,805,029 | B1 * | 10/2004 | Foster | ................. B25B 23/0035 |
| | | | | 81/119 |
| 2007/0227640 | A1 | 10/2007 | Ingram | |
| 2008/0061623 | A1 | 3/2008 | Gerstenslager et al. | |
| 2013/0199685 | A1 | 8/2013 | Nelson et al. | |
| 2014/0265533 | A1 | 9/2014 | Polka | |

OTHER PUBLICATIONS

PCT Application No. PCT/US2016/037257, International Search Report and Written Opinion dated Sep. 30, 2016, 13 pages.

* cited by examiner

INFLATION HUBCAP INSTALLATION SYSTEM

RELATED APPLICATIONS

This application is a 35 USC § 371 National Stage application of International Application No. PCT/US2016/037257, entitled "INFLATION HUBCAP INSTALLATION SYSTEM," filed on Jun. 13, 2016, which claims the benefit of U.S. Provisional Patent Application No. 62/175,861, filed Jun. 15, 2015, the disclosure of which are incorporated herein by reference in their entireties for all purposes.

TECHNICAL FIELD

This patent application is directed to tools and, more specifically, to an inflation hubcap installation tool and system incorporating the same.

BACKGROUND

Tractor trailers often employ a central tire inflation system to maintain tire pressure to enhance safety, tire life, and fuel efficiency. Typical tractor trailer axles are hollow with axle ends having a through bore. The hollow axle provides a conduit through which air pressure is supplied to the trailer's tires. With reference to FIGS. 1 and 2, pressurized air is supplied to the end of the axle (not shown) with an air hose 10 inserted within the axle. The air hose 10 is connected to a rotary union 12 mounted on an inflation hubcap 14 that supplies the pressurized air to the tires via ports 16. The air hose 10 is connected to the rotary union 12 with an air fitting 18 that rotates with respect to the inflation hubcap 14.

In order to assemble the air hose 10 to the rotating air fitting 18, an installer typically requires two open end wrenches. One is used to hold the air hose 10 in the axle, and the other is used to turn the air fitting 18. Because the installer must use both hands to turn the wrenches, the installer must also devise a way to support the inflation hubcap 14. This can be a difficult and time-consuming process. Furthermore, it is difficult to work with two wrenches in the confines of the hubcap interior 20. After the initial assembly of the air hose 10 and the air fitting 18, the installer uses yet another tool, such as a torque wrench, to achieve proper tightening torque.

Accordingly, there is a need for tools to facilitate the installation of inflation hubcaps. Specifically, there is a need for tools to simplify connecting an air system air hose to the rotating air fitting of an inflation hubcap rotary union.

BRIEF DESCRIPTION OF THE DRAWINGS

Embodiments of the inflation hubcap installation system introduced herein may be better understood by referring to the following Detailed Description in conjunction with the accompanying drawings, in which like reference numerals indicate identical or functionally similar elements.

Figure 1:
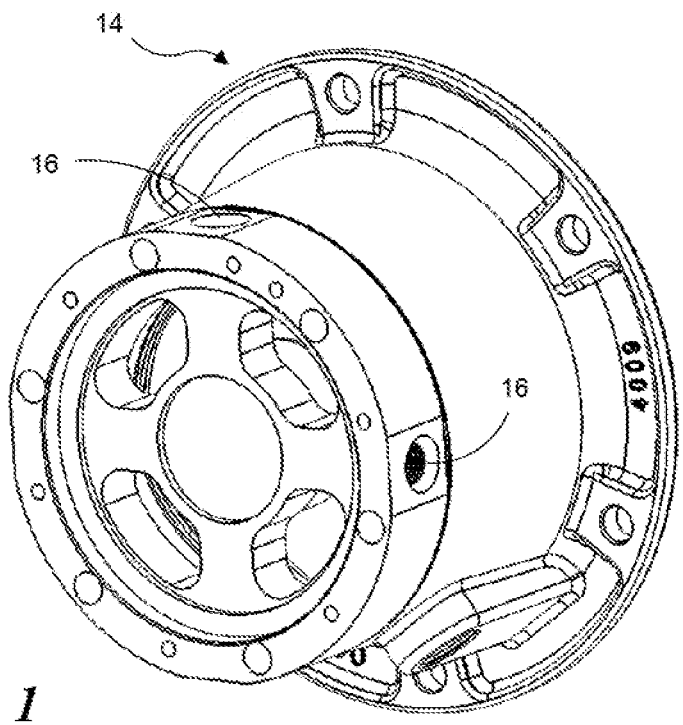
FIG. 1 is an isometric view of an inflation hubcap as viewed from the front.
Figure 2:
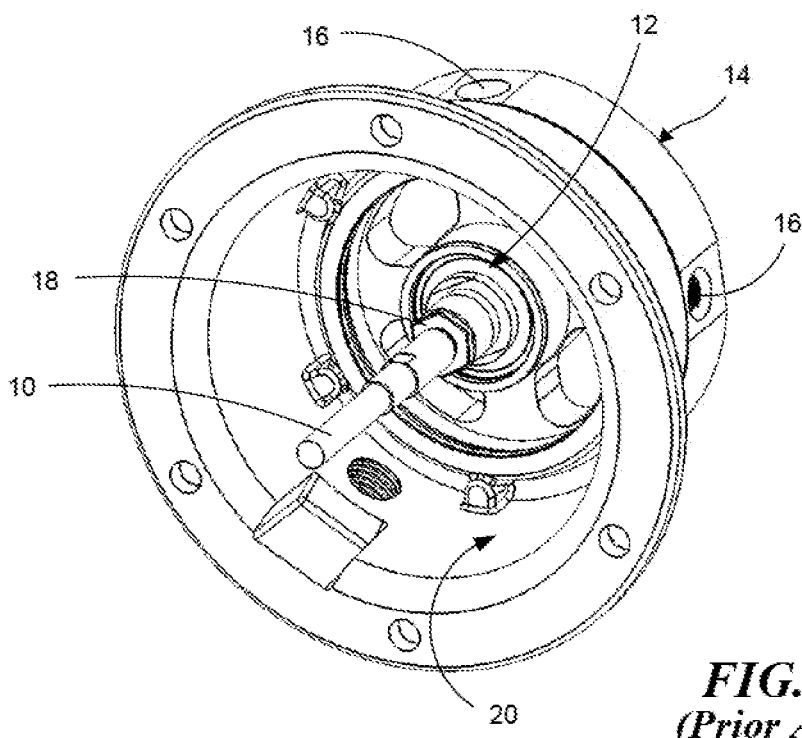
FIG. 2 is an isometric view of the inflation hubcap shown in FIG. 1 as viewed from the back.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

An inflation hubcap installation system for connecting an air hose to an inflation hubcap air fitting is disclosed. The inflation hubcap installation system includes a locking tool, a tool retainer, and a torque wrench adapter. The locking tool includes a hubcap interface portion and a wrench portion configured to engage the air fitting when the hubcap interface portion is connected to the inflation hubcap. The tool retainer connects to the locking tool and retains the locking tool on the inflation hubcap. The torque wrench adapter engages the air hose and connects to a suitable torque wrench.

In operation, the locking tool prevents rotation of the air fitting relative to the inflation hubcap. Thus, the hubcap and air fitting can be rotated together as a unit while threading the air hose and the air fitting together. The torque wrench adapter connects a torque wrench to the air hose, and by rotating the inflation hubcap and air fitting together as a unit relative to the torque wrench, the proper tightening torque can be achieved. The disclosed inflation hubcap installation system provides a very quick method to attach the inflation hubcap to the stationary air hose inside the axle, thereby reducing installation time by approximately 50% or more.

General Description

Various examples of the systems and devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 3:
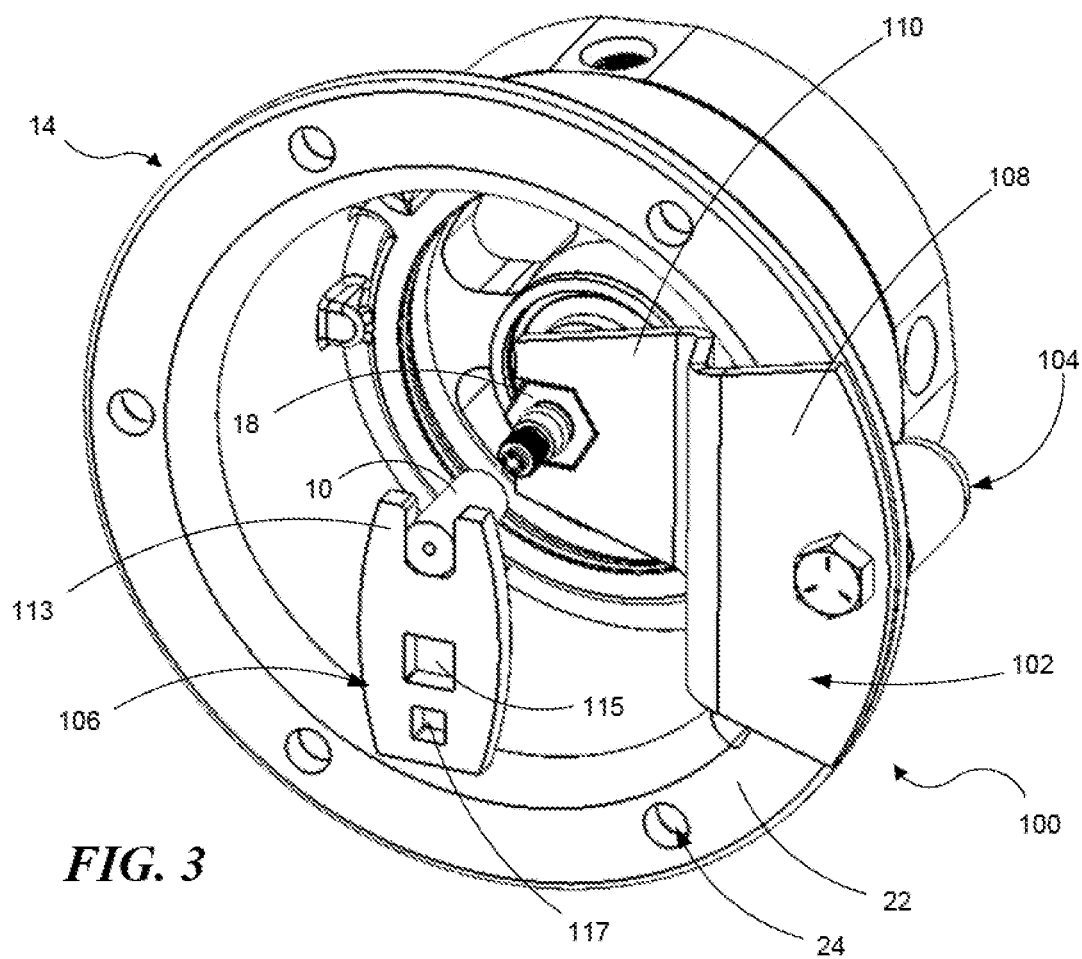
FIG. 3 is an isometric view illustrating an inflation hubcap installation system according to a representative embodiment.
Figure 4:
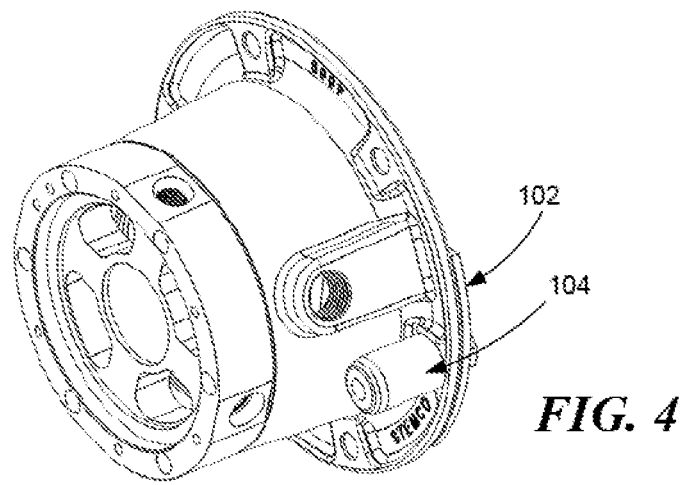
FIG. 4 is an isometric view illustrating the inflation hubcap installation system of FIG. 3 as viewed from the front of the inflation hubcap.

With reference to FIGS. 3 and 4, the inflation hubcap installation system 100 includes a locking tool 102, a tool retainer 104, and a torque wrench adapter 106. Locking tool 102 includes a hubcap interface portion 108 and a wrench portion 110 configured to engage the air fitting 18 when the hubcap interface portion 108 is connected to the inflation hubcap 14. The hubcap interface portion 108 mates with a mounting flange 22 of the inflation hubcap 14. The tool retainer 104 is connectable to the locking tool 102 and is operative to retain the locking tool 102 on inflation hubcap 14.

The torque wrench adapter 106, sometimes referred to as a crow's foot, includes a wrench portion 113 configured to engage the air hose 10. The torque wrench adapter 106 also includes a square aperture 115 sized to receive a ⅜ inch ratchet drive. In some embodiments, the torque wrench adapter 106 includes a second square aperture 117 that is sized to receive a ¼ inch ratchet drive. The torque wrench adapter 106 is therefore operative to allow an installer to use a torque wrench to properly torque the air hose 10 onto air fitting 18.

Figure 5:
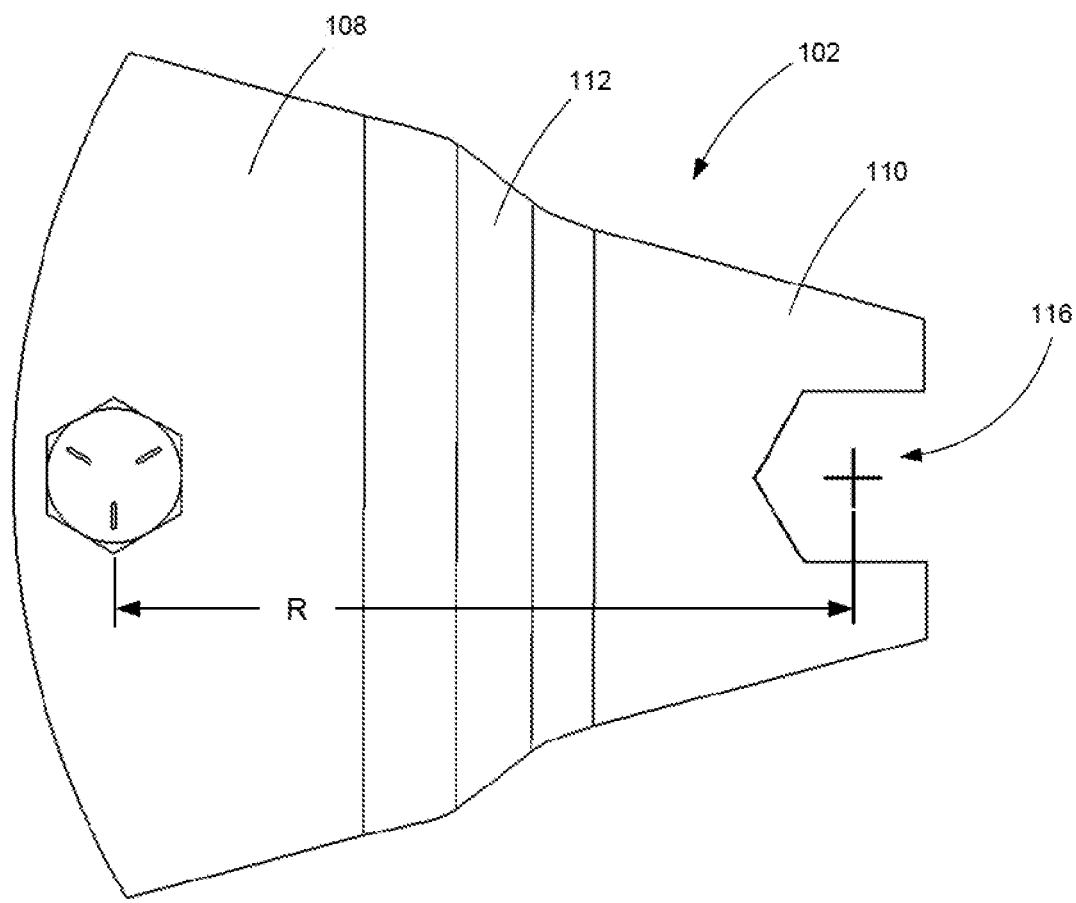
FIG. 5 is a top plan view of a locking tool according to a representative embodiment.
Figure 6:
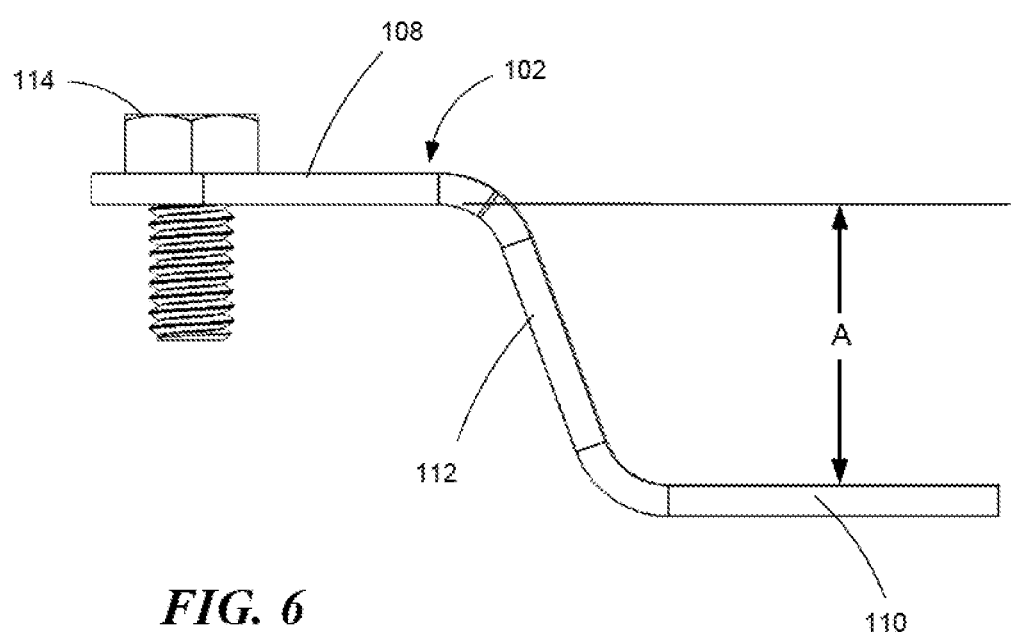
FIG. 6 is a side view in elevation of the locking tool shown in FIG. 5.

As shown in FIG. 5, the locking tool 102 includes an intermediate portion 112 extending between the hubcap interface portion 108 and the wrench portion 110. The wrench portion 110 is configured as an open-end hex wrench 116. In the context of inflation hubcap 14, it can be appreciated from FIGS. 5 and 6 that the hubcap interface portion 108 is radially offset from the wrench portion 110 by a distance R. With specific reference to FIG. 6, it can be appreciated that the hubcap interface portion 108 is also axially offset from wrench portion 110 by a distance A. The hubcap interface portion 108 and the wrench portion 110 comprise a pair of planar regions that are substantially parallel to each other.

The locking tool 102 includes a locator projection 114 in the form of a screw that is attached to the hubcap interface portion 108. Locator projection 114 is sized to engage mounting hole 24 of the mounting flange 22 (see FIG. 3). In some embodiments, the locator projection 114 is threaded into the locking tool 102. However, in other embodiments, the locator projection 114 can be in the form of a pin pressed, welded, or otherwise secured to the locking tool 102. In some embodiments, the locator projection 114 can be attached with a thread-locking compound to prevent removal of the locator projection 114. In some embodiments, the locking tool 102 is comprised of sheet metal material that is bent as shown. It should be appreciated that the disclosed locking tool may be adapted to fit different-sized inflation hubcaps. Accordingly, the radial and axial offset distances R and A can be adjusted to fit different inflation hubcaps. Similarly, the locator projection 114 can be sized to mate with mounting holes of various inflation hubcaps.

Figure 7:
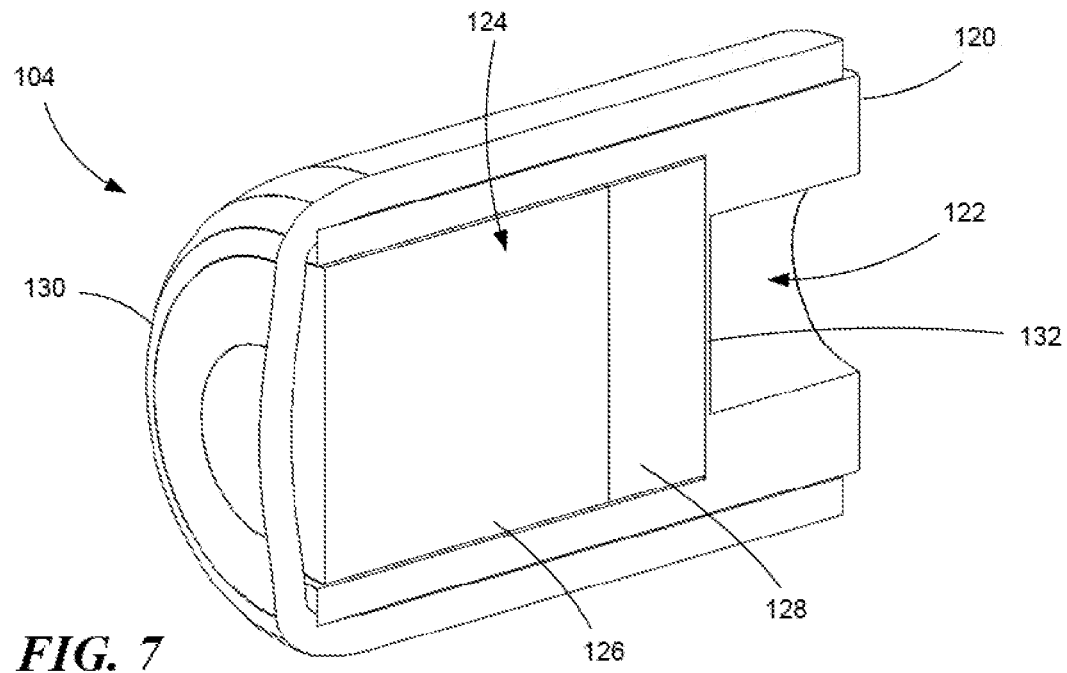
FIG. 7 is an isometric cross-section of a tool retainer according to a representative embodiment.
Figure 8:
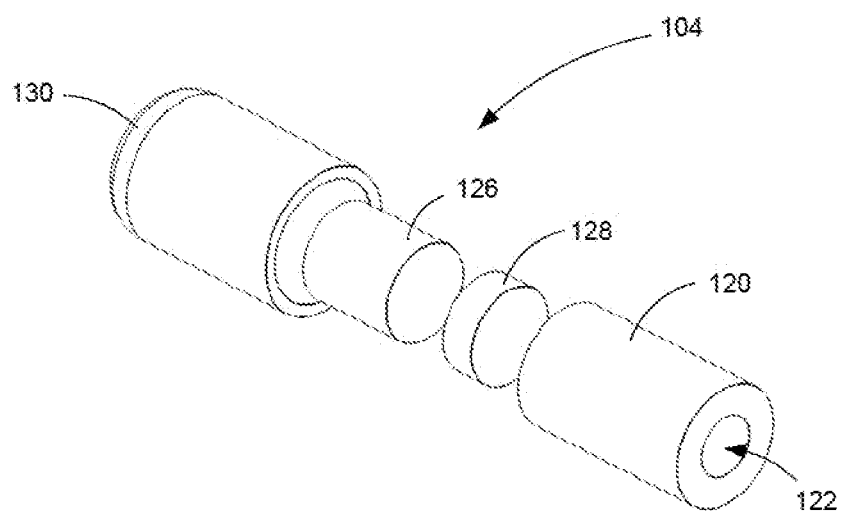
FIG. 8 is an exploded isometric view of the tool retainer shown in FIG. 7.

FIGS. 7 and 8 illustrate tool retainer 104 that receives the locator projection 114 (FIG. 6) through aperture 122. The tool retainer 104 is retained on the locator projection 114 by a suitable magnet 128. For example, in some embodiments, magnet 128 is a neodymium magnet. The magnet 128 is housed in a bore 124 formed in sleeve 120 opposite aperture 122. In some embodiments, there is a wall or membrane 132 between bore 124 and aperture 122. Magnet 128 is maintained in position by a foam insert 126. A rubber cover 130 is positioned over the sleeve 120 to contain the foam insert 126 and magnet 128 within bore 124. In some embodiments, the tool retainer 104 can be a threaded member such as a nut, wingnut, thumbnut, or thread coupling. However, the disclosed magnetic tool retainer 104 provides a high-speed assembly tool to retain the locking tool 102 to the inflation hubcap 14.

Having described the structure of the inflation hubcap installation system 100, the operation of the inflation hubcap installation system is now described. With reference again to FIG. 3, the locking tool 102 prevents rotation of the air fitting 18 relative to the inflation hubcap 14. Thus, the inflation hubcap 14 and air fitting 18 can be rotated together as a unit while threading the air hose 10 and air fitting 18 together. Torque wrench adapter 106 connects a torque wrench (not shown) to the air hose 10. By rotating the inflation hubcap 14 and air fitting 18 together as a unit relative to the torque wrench, the proper tightening torque can be achieved. Accordingly, the disclosed inflation hubcap installation system 100 provides a very quick method to attach the inflation hubcap 14 to the stationary air hose 10, thereby reducing installation time by approximately 50% or more.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. An inflation hubcap installation system for connecting an air hose to an air fitting of an inflation hubcap, the inflation hubcap installation system comprising:
 a locking tool including a hubcap interface portion and a wrench portion configured to engage the air fitting when the hubcap interface portion is connected to the inflation hubcap, wherein the hubcap interface portion comprises a planar region mateable with a mounting flange of the inflation hubcap;
 a locator projection positioned on the planar region to engage a mounting hole formed through the mounting flange;
 a tool retainer comprising a magnet disposed in a sleeve connected to the locking tool and operative to retain the locking tool on the inflation hubcap, wherein the tool retainer is connected to the locator projection; and
 a torque wrench adapter configured to engage the air hose.

2. The inflation hubcap installation system of claim 1, wherein the hubcap interface portion is offset from the wrench portion.

3. The inflation hubcap installation system of claim 1, wherein the locking tool comprises sheet metal.

4. The locking tool of claim 1, wherein the locator projection is a screw.

5. The locking tool of claim 1, wherein the wrench portion is radially and axially offset from the hubcap flange interface portion.

6. The locking tool of claim 5, further comprising an intermediate portion extending between the hubcap flange interface portion and the wrench portion.

7. The locking tool of claim 5, wherein the wrench portion is configured as an open-end hex wrench.

* * * * *